United States Patent [19]

Seki et al.

[11] 4,174,224
[45] Nov. 13, 1979

[54] SAND MOLD COMPOSITION

[75] Inventors: Sigeru Seki, Urawa; Tatsuhiko Noguchi, Iwaki; Minoru Ohta, Iwaki; Ryuichi Kurita, Iwaki, all of Japan

[73] Assignee: Kureha Kagaku Kogyo Kabushiki Kaisha, Tokyo, Japan

[21] Appl. No.: 935,546

[22] Filed: Aug. 21, 1978

[30] Foreign Application Priority Data

Aug. 26, 1977 [JP] Japan .................. 52-101530

[51] Int. Cl.² ............................................. B28B 7/34
[52] U.S. Cl. .................................. 106/38.3; 106/38.9; 106/74; 106/84
[58] Field of Search .................. 106/38.3, 38.35, 38.9, 106/74, 84

[56] References Cited

U.S. PATENT DOCUMENTS

| 3,137,046 | 6/1964 | Barlow et al. ............... 106/38.35 |
| 3,424,600 | 1/1969 | Liass et al. ................. 106/38.35 |

*Primary Examiner*—Lorenzo B. Hayes
*Attorney, Agent, or Firm*—Stevens, Davis, Miller & Mosher

[57] ABSTRACT

A self-hardening composition for making sand molds comprising a molding sand, a water glass as a binder and at least one salt of imidodisulfonic acid as a hardener.

5 Claims, 1 Drawing Figure

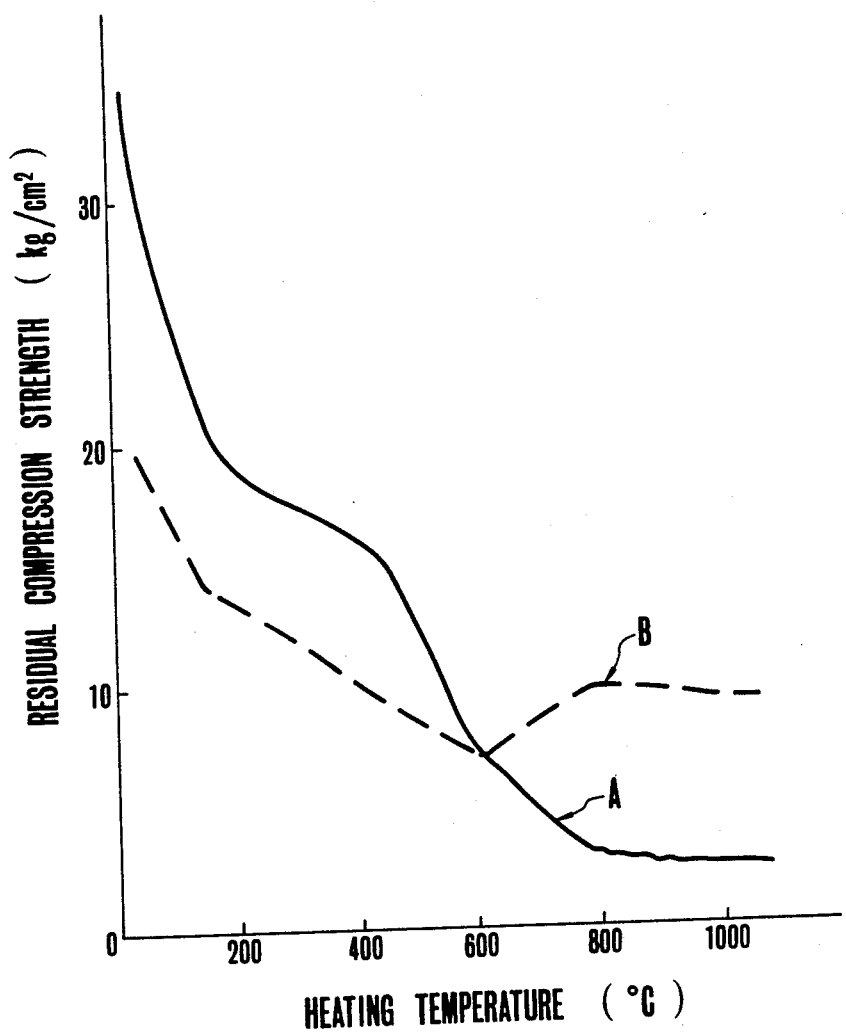

SAND MOLD COMPOSITION

This invention relates to a novel composition for a sand mold, and more particularly to a composition for a sand mold featuring addition of imidodisulfonate(s) as a hardener into a mixture of molding sand and water glass (an aqueous sodium silicate solution).

As is well known in the art, a sand mold is usually produced by shaping molding sand into a mold by using water glass as a binder. Since an extremely long time is required for hardening of the mold when water glass alone is used as a binder, it is common practice to further mix a hardening accelerator such as dicalcium silicate, sodium silicofluoride, glyoxal, ferrosilicon, sodium aluminate, phosphates, polyhydric alcohols, carboxylic esters or such with the sand mold composition.

However, the sand molds formed by these known methods have the serious effect that they can hardly be used repeatedly because of poor collapsibility after use for casting.

The primary object of this invention, therefore, is to provide a novel and improved composition for sand mold which is very easy to collapse after use and which has an ideal hardening rate and the requisite compressive strength during shaping.

According to this invention, these and other objects can be accomplished by providing a novel mold composition comprising a molding sand, a water glass as a binder and at least one salt of imidodisulfonic acid as a hardener.

The type of water glass used in the composition of this invention is not specifically limited, and any suitable kind of water glass such as water glass #1 to #3 shown in JIS K 1408-1966 may be used. However, in case of using an imidodisulfonate of relatively high acidity, it is advantageous to use water glass #2 which has a low silica/soda ($SiO_2/Na_2O$) mole ratio (a high $Na_2O$ content) for obtaining the product with a desired hardening rate and strength, but in case of using an imidodisulfonate of low acidity, it is advantageous to use water glass #3 or #4 with a high $SiO_2/Na_2O$ mole ratio.

The imidodisulfonates used in the composition of this invention can be obtained in large quantities and at a low cost as a by-product from a process for removing sulfur compounds and/or nitrogen oxides in a wet system using a solution of a sulfite, Fe(II) salt or the like as an absorbing solution, and the effective utilization of such materials is very advantageous from the standpoint of reserving of resources and energy saving.

One or more of the various salts of imidodisulfonic acid may be employed in this invention such as the sodium salt, potassium salt, calcium salt, magnesium salt, etc. It is possible to adjust the pH of the sand mold composition or to control the hardening rate by suitably using the salts of different acidity (ranging from 4 to 11 in pH) and solubility such as $Ca(SO_3)_2NH$,

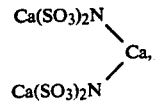

$Ca(SO_3)NNa$, $Ca(SO_3)_2NK$, $Ca(SO_3)_2NNa.3H_2O$, $Ca(SO_3)_2NH.3H_2O$,

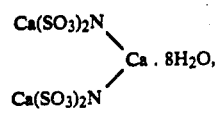

etc., either singly or in combination as a hardener. For instance, it is possible to control the working life by adding $(NaSO_3)_2NNa$ anhydride to $Ca(SO_3)_2NNa.3H_2O$ in a suitable ratio thereby to improve workability and mold strength.

From the viewpoint of collapsibility, it is preferred to use a salt rich in alkaline metals such as sodium and potassium.

The amount of the imododisulfonate added to the composition is variable depending on the kind of sodium silicate, the ratio of sodium silicate to sand and the kind of imidodisulfonate used, but generally the amount may be 0.3 to 3% by weight when using water glass in an amount of 5 to 7% by weight of sand. This range, however, is not critical. Such a hardener may be mixed with the molding sand before, after or during the addition of water glass to the sand. A foaming agent or a surface active agent may be combined for giving flowability to the molding sand. It is also possible to add a known collapsible agent such as pitch, magnesia, pulverized wood or the like.

An understanding of the invention may be facilitated by reference to the accompanying FIGURE in which the relationship between the residual compressive strength of the sand mold of this invention (curve A) and that of a sand mold of the prior art (curve B) and the heating temperature is illustrated. The experimental conditions and other particulars are described in Example 5 which follows.

As apparent from the FIGURE, the sand mold according to this invention although it has an extremely high strength under ordinary temperature, becomes easily collapsible when exposed to a temperature higher than about 800° C. which corresponds to the casting temperature for metals. In other words, the sand mold formed by the composition of this invention shows a collapsibility factor of greater than 3, the collapsibility factor being defined as a ratio of the compressive strength of the mold before heating to the residual compressive strength of the mold after heated at a temperature of higher than 800° C. As is seen from the curve B in the Figure a conventional sand mold has a collapsibility factor of 2 at most.

Other advantages and features of this invention will become apparent from following description of the non-restrictive embodiments of the invention.

EXAMPLE 1

One part by weight of $Ca(SO_3)_2NNa.3H_2O$ powder was mixed with 100 parts by weight of molding sand #65 (JIS G 5901-1974), and to two specimens of this mixture was added water glass #3 ($SiO_2/Na_2O$ mole ratio=3.2, 15° C., 40° Bé) in amounts of 6 parts and 5 parts, respectively, and each mixture was kneaded uniformly. Then each mixture was put into a steel pipe of 50 mm in diameter and of 100 mm in height and a 5 kg weight was dropped onto the mixture to compress the composition to such an extent that no more contraction can occur in the sand mold thus formed. The top of the pipe was sealed with a sheet of polywood to preserve the mold. The test piece was released from the frame (the pipe) at suitable time intervals and its compressive strength was determined by a compressive strength tester. The results are shown in Table 1 below.

EXAMPLE 2

One part by weight of

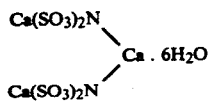

was mixed with 100 parts by weight of the moldings and #65, and to this mixture was added 6 parts of water glass #3 ($SiO_2/Na_2O$ mole ratio=3.2, 15° C., 40° Bé) followed by homogenous kneading. This mixture was then put into a steel pipe 50 mm in diameter and 100 mm in height and a 5 kg weight was dropped onto the mixture to compress the compound to such an extent that no more contraction could occur in the sand mold thus formed. The mold was then subjected to a compressive strength measurement as in Example 1 to obtain the result shown in Table 1.

COMPARATIVE EXAMPLE

Three parts by weight of dicalcium silicate were mixed with 100 parts by weight of molding sand #65, followed by addition of 6 parts by weight of water glass #3 ($SiO_2/Na_2O$ mole ratio=3.2, 15° C., 40° Be) and homogeneous kneading, and the product was subjected to a compressive strength measurement as in Example 1 to obtain the results shown in Table 1.

imidodisulfonate was used than when dicalcium silicate was used as a hardener.

The thus hardened products of Examples 1 and 2, when heat-treated at 800° C. and 1,000° C., respectively, showed a far better collapsibility than the product of Comparative Example for which dicalcium silicate was used.

EXAMPLE 3

1.33 parts by weight of $Ca(SO_3)_2NNa.3H_2O$ power were mixed with 100 parts by weight of molding sand #65, and to this mixture was added 5 parts by weight of water glass #3. Apart from this, 0.67 part by weight of $Ca(SO_3)_2NNa.3H_2O$ and 0.67 part by weight of $(NaSO_3)_2NNa$ anhydride were mixed with 100 parts by weight of molding sand #65, and to this mixture was added 5 parts by weight of water glass #3, and the compressive strength was determined on the products from these two mixtures. The results are shown in Table 2.

EXAMPLE 4

Experiments were conducted in the same way as Example 3 with the mixing ratios shown in Table 2 by using water glass #2, to obtain the results shown in Table 2.

As is noted from the table, the compressive strength was better and also the working life was slightly longer when $(NaSO_3)_2NNa$ was mixed with $Ca(SO_3)_2NNa.3H_2O$ than when the latter was used alone.

Table 2

| | Mixing ratio per 100 parts by weight of molding sand | | | Compressive strength ($kg/cm^2$) after hours | | |
|---|---|---|---|---|---|---|
| | Sodium silicate | Imido-disulfo-nate A | Imido-disulfo-nate B | 3 | 6 | 24 |
| Example 3 | (#3) 5 | $Ca(SO_3)_2NNa \cdot 3H_2O$ 1.33 | None | 8.9 | 9.2 | 18.0 |
| | (#3) 5 | $3H_2O$ 0.67 | $(NaSO_3)_2NNa$ 0.67 | 9.5 | 12.1 | 22.5 |
| Example 4 | (#2) 5 | $Ca(SO_3)_2NNa \cdot 3H_2O$ 1.33 | None | 3.1 | 5.5 | 34.6 |
| | (#2) 5 | $3H_2O$ 0.67 | $(NaSO_3)_2NNa$ 0.67 | 3.8 | 7.2 | 37.7 |

EXAMPLE 5

Table 1

| | Mixing ratio per 100 parts by weight of molding sand | | | Compressive strength ($kg/cm^2$) after hours | | |
|---|---|---|---|---|---|---|
| | Sodium silicate | Imidodi-sulfonate | Other hardener | 1 | 3 | 22 |
| Example 1 | 6 | $Ca(SO_3)_2NNa \cdot 3H_2O$ 1.0 | — | 3.2 | 10.3 | 17.5 |
| | 5 | | — | 2.3 | 8.6 | 16.7 |
| Example 2 | 6 | $[Ca(SO_3)_2N]_2Ca \cdot 6H_2O$ 1.0 | — | 3.5 | 12.0 | 18.0 |
| Comparative Example | 6 | — | Dicalcium silicate | 1.1 | 5.4 | 18.4 |

The compressive strength of the mold increased slightly faster when a mixture of water glass and an 1.33 parts by weight of $Ca(SO_3)_2NNa.3H_2O$ were mixed with 100 parts by weight of molding sand #65, followed by addition of 5 parts by weight of water glass

2, and the mixture was kneaded homogeneously. The mixture was heat-treated 24 hours after shaping and its compressive strength was determined as in Example 1. The residual compressive strengths as determined after 30 minute heating at the respective temperatures and then air-cooling were plotted as Curve A in the Figure. Also, the residual compressive strength determined after the similar heat treatment of the comparative product obtained by mixing 2.5 parts by weight of dicalcium silicate and 5 parts by weight of water glass #2 with 100 parts by weight of molding sand #65 is plotted as Curve B in the Figure.

As is apparent from the Figure, mixing of $Ca(SO_3)_2\cdot NNa\cdot 3H_2O$ in addition to another imidodisulfonate provides a better collapsibility of the sand mold at high temperature.

What is claimed is:

1. A self-hardening composition for making sand molds comprising a molding sand, a water glass as a binder and at least one salt of imidodisulfonic acid as a hardener.

2. The composition according to claim 1, wherein said salt of imidodisulfonic acid is the sodium salt, potassium salt, calcium salt or magnesium salt.

3. The composition according to claim 1, wherein said salt of imidodisulfonic acid is selected from the group consisting of $(NaSO_3)_2N$ Na, $Ca(SO_3)_2NNa$, $Ca(SO_3)_2NH$, $[Ca(SO_3)_2N]_2Ca$, $Ca(SO_3)_2NK$, $Ca(SO_3)_2NNa\cdot 3H_2O$, $Ca(SO_3)_2NH\cdot 3H_2O$, $[Ca(SO_3)_2N]_2Ca\cdot 6H_2O$ and $[Ca(SO_3)_2N]_2Ca\cdot 8H_2O$.

4. The composition according to claims 1, 2 or 3, which comprises 100 parts by weight of said molding sand, 5–7 parts by weight of said water glass and 0.3–3 part by weight of said imidodisulfonate.

5. A sand mold comprising the shaped and hardened composition of claims 1, 2 or 3, said mold having a collapsibility factor of larger than 3, said collapsibility factor being defined as the ratio of the compressive strength of the mold to the residual compressive strength of the mold after heating at a temperature above 800° C.

* * * * *

UNITED STATES PATENT AND TRADEMARK OFFICE
CERTIFICATE OF CORRECTION

PATENT NO. : 4,174,224
DATED : November 13, 1979
INVENTOR(S) : Sigeru SEKI ET AL It is certified that error appears in the above-identified patent and that said Letters Patent are hereby corrected as shown below:

Column 4, line 10, in Example 3, change "power" to --powder--

In Table 2, column 2, change "$3H_2O0.67$" to --$Ca(SO_3)_2NNa \cdot 3H_2O0.67$--

In Table 2, column 2, line 45, change "$3H_2O0.67$" to --$Ca(SO_3)_2NNa \cdot 3H_2O0.67$--

In Table 2, line 46, column 2, delete "0.67"

In Table 2, column 3, last line, insert --0.67-- (under the formula)

Signed and Sealed this

Seventeenth Day of June 1980

[SEAL]

Attest:

SIDNEY A. DIAMOND

*Attesting Officer*     *Commissioner of Patents and Trademarks*